United States Patent Office 2,983,621
Patented May 9, 1961

2,983,621

CELLULOSE ORGANIC ESTER COMPOSITIONS STABILIZED WITH A SYNERGISTIC MIXTURE OF COPPER STEARATE AND PARA-TERTIARY-BUTYL PHENOL

Gordon C. Newland and John W. Tamblyn, Kingsport, Tenn., assignors to Eastman Kodak Company, Rochester, N.Y., a corporation of New Jersey No Drawing. Filed June 19, 1959, Ser. No. 821,364

2 Claims. (Cl. 106—171)

This invention relates to stabilized cellulose organic acid ester plastics. More particularly, it relates to cellulose organic acid ester plastics stabilized against weathering by the incorporation of a synergistic combination of copper stearate and p-tertiary butyl phenol.

Organic plastic compositions usually require incorporation of a light stabilizer for successful outdoor use. In the case of cellulose organic acid ester plastics, such, for example, as cellulose acetate, cellulose propionate, cellulose butyrate, cellulose acetate-propionate and cellulose acetate-butyrate plastics, phenyl salicylate is often added for this purpose. However, for the maximum degree of protection against the degrading action of ultraviolet light, it has sometimes been found necessary to provide, in addition to the primary protective action furnished by an appropriate ultraviolet absorber, a secondary protective action to minimize the harmful effects of the by-products of the residual primary photoreaction. In combination with ultraviolet stabilizers, antioxidants can often act in this way as supporting stabilizers. Although not primary light stabilizers themselves they can be very effective as secondary stabilizers, inhibiting the secondary thermal reactions which take place in the dark after the primary photochemical action occurs.

We have found that a remarkable synergistic effect in stabilizing cellulose organic acid ester plastics is obtained with a mixture of copper stearate and p-tertiary-butyl phenol. Such a mixture represents a considerable improvement over phenyl salicylate, as far as stabilizing efficiency in cellulose organic acid ester plastics is concerned.

Both copper stearate and p-tertiary-butyl phenol were tested individually as light stabilizers in cellulose acetate butyrate plastic compositions. The results were compared with those obtained from a mixture of these two additives, and also with the effects of the well-known light stabilizer phenyl salicylate. One part by weight of the additive to be tested was incorporated, by hot roll compounding, in 100 parts by weight of cellulose acetate butyrate (13% acetyl, 38% butyryl) along with 12 parts by weight of the plasticizer dibutyl sebacate. In the case of mixed additives, one part of each additive was used. The resulting plastic composition was then compression-molded into sheets of 0.050 inch thickness, which were cut into 2.5 x 0.5 inch test strips. Some of these strips, of each composition, were exposed for various lengths of time in a modified Atlas Twin-Arc weatherometer (Anal. Chem. 25, 460 (1953)). Other strips of the same compositions were exposed outdoors at Kingsport, Tennessee. The progress of weathering damage was quantitatively followed by measurement of flexural strength, brittleness and inherent viscosity. Flexural strength was measured by the Tour-Marshall test for stiffness in flexure (ASTM D747-43). Brittleness was defined to have developed when a break occurred at a bend angle of less than 90° in the Tour-Marshall test. Viscosities were measured in acetone solutions containing 0.23 g. of cellulose ester per 100 cc. of solvent at 25° C. The inherent viscosity was defined as $$\frac{\ln \eta_r}{0.23}$$

where $\eta_r$ is the ratio of viscosity of solution to viscosity of solvent. Usually the test strips became brittle when either flexural strength or inherent viscosity fell off to about 75% of their original values before exposure.

Many plasticizers for cellulose organic acid esters are shown in the art, and it will be understood that plasticizers other than dibutyl sebacate may be used, and that the choice and proportion of plasticizer forms no part of our invention.

Data obtained in the weatherometer tests are shown in Table I. The pronounced synergistic effect produced by the mixture of additives is evident. It is to be noted that neither the copper stearate alone nor the p-tertiary-butyl phenol alone gave a worthwhile degree of stabilization.

Table I

| Stabilizer | Weather-Ometer Exposure (Hr.) Required for— | | |
|---|---|---|---|
| | 25% Loss of Flexural Strength | Development of Brittleness | 25% Loss of Inherent Viscosity |
| None | 300 | 300 | 250 |
| Phenyl salicylate (1 part) | 800 | 750 | 900 |
| Copper stearate (1 part) | 450 | 300 | 800 |
| p-tert-Butylphenol (1 part) | 300 | 250 | 300 |
| Copper stearate (1 part) + p-tert-butylphenol (1 part) | 2,700 | 1,800 | 3,000 |

Results obtained in the outdoor weathering of the same compositions are given in Table II. These show that the mixed stabilizer effects a similar synergistic improvement in natural weathering. Not only was it much superior to the individual additives in protecting the physical properties of the plastic during weathering, but it also preserved the original smooth, shiny surface to a much greater degree than did any of the single additives.

Table II

| Stabilizer | Outdoor Exposure (Mo.) Required for— | | |
|---|---|---|---|
| | 25% Loss of Flexural Strength | Development of Brittleness | 25% Loss of Inherent Viscosity |
| None | 13 | 10 | 10 |
| Phenyl salicylate (1 part) | 55 | 55 | |
| Copper stearate (1 part) | 15 | 12 | 12 |
| p-tert-Butylphenol (1 part) | 23 | 20 | 30 |
| Copper stearate (1 part) + p-tert-butylphenol (1 part) | >84 | >84 | 70 |

Results similar to those in Table II have been obtained on specimens of ⅛ inch thickness in larger scale outdoor exposure tests at Phoenix, Arizona.

While we have shown the stabilizers in the amounts of 1 part of each stabilizer to 100 parts of cellulose ester, it will be understood that smaller and larger amounts of the mixture of stabilizers may be used, within the range of from 0.1 part to 10 parts by weight of mixed stabilizer per 100 parts of cellulose organic acid ester, and that some variation in the ratio of the amounts of the stabilizers to each other is permissible.

We claim:

1. A cellulose organic acid ester plastic composition comprising a cellulose ester selected from the group consisting of cellulose acetate, cellulose propionate, cellulose butyrate, cellulose acetate-propionate and cellulose acetate-butyrate, stabilized against deterioration by weathering by a content of from 0.1 part to 10 parts by weight, per 100 parts by weight of cellulose ester, of a mixture of approximately equal parts by weight of copper stearate and p-tertiary-butyl phenol.

2. A cellulose acetate butyrate plastic composition stabilized against deterioration by weathering by a content of from 0.1 part to 10 parts by weight, per 100 parts by weight of cellulose acetate-butyrate, of a mixture of approximately equal parts by weight of copper stearate and p-tertiary-butyl phenol.

References Cited in the file of this patent

UNITED STATES PATENTS

| | | |
|---|---|---|
| 2,710,811 | De Groes et al. | June 14, 1955 |
| 2,819,978 | Long et al. | Jan. 14, 1958 |
| 2,899,316 | Rouse et al. | Aug. 11, 1959 |